March 23, 1971    P. T. MATTSON, JR., ET AL    3,572,405
APPARATUS FOR BLENDING PARTICLES
Filed June 6, 1968    2 Sheets-Sheet 1

INVENTORS
PHILIP T. MATTSON JR.
DENNIS W. STEVENS

ATTY

March 23, 1971 P. T. MATTSON, JR., ET AL 3,572,405
APPARATUS FOR BLENDING PARTICLES
Filed June 6, 1968 2 Sheets-Sheet 2
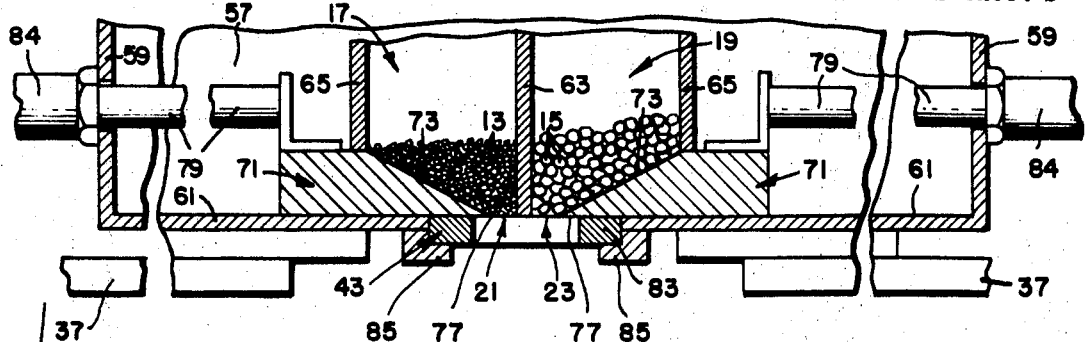
FIG.3
FIG.4
INVENTORS
PHILIP T. MATTSON JR.
DENNIS W. STEVENS
ATTY

United States Patent Office 3,572,405
Patented Mar. 23, 1971

3,572,405
APPARATUS FOR BLENDING PARTICLES
Philip T. Mattson, Jr., La Jolla, and Dennis W. Stevens, San Diego, Calif., assignors to the United States of America as represented by the United States Atomic Energy Commission
Filed June 6, 1968, Ser. No. 735,119
Int. Cl. B65b 1/02, 3/02
U.S. Cl. 141—105                                      10 Claims

ABSTRACT OF THE DISCLOSURE

Particles of at least two groups are fed at predetermined rates of flow to impinge on a deflecting surface means which causes the particles to blend uniformly as they fall into a cavity in which the blended particles are shaped into an article. The particles of the respective groups are blended uniformly even though the particles may be unequal in size and density and the ratio of the respective particles in the article is varied considerably from a one to one ratio.

---

This invention relates to a method of and an apparatus for blending predetermined amounts of different groups of particles into a substantially uniform composition in a cavity of a given shape.

The present invention is described in connection with the manufacture of nuclear fuel bodies having a blend of fertile and fissile particles. Typically, both the fertile and fissile particles are generally spheroidal in shape, but may differ both in average particle size and in particle density. The ratio of fertile particles to fissile particles being combined may also vary for the particular use of a fuel body. For example, there may be a one to one ratio by volume of the respective particles for one fuel body and a 70%–30% ratio of particles for another fuel body, Whatever the desired ratio, the fuel body should have a uniform distribution of the respective particles throughout, and the preferred degree of uniformity should be as close as possible to the maximum theoretical uniformity of distribution.

The fertile and fissile particles, described herein, are extremely small, usually less than 1,000 microns in diameter and include coatings that are subject to fracture if not handled reasonably carefully. Preferably, the particles are packed together relatively tightly to have a good packing fraction, i.e., the ratio of actual volume occupied by the particles to volume of the geometrical shape of the fuel body.

Accordingly, an object of the invention is to provide an efficient method of and apparatus for blending small particles to form an article, such as a nuclear fuel body, having a relatively uniform blend.

Other objects and advantages of the invention will become apparent from the detailed description taken in connection with the accompanying drawings in which:

FIG. 3 is an enlarged, fragmentary sectional view taken generally along line 3—3 of FIG. 2; and FIG. 4 is a perspective view of a nuclear fuel body prepared with the apparatus of FIG. 1.

Figure 1:
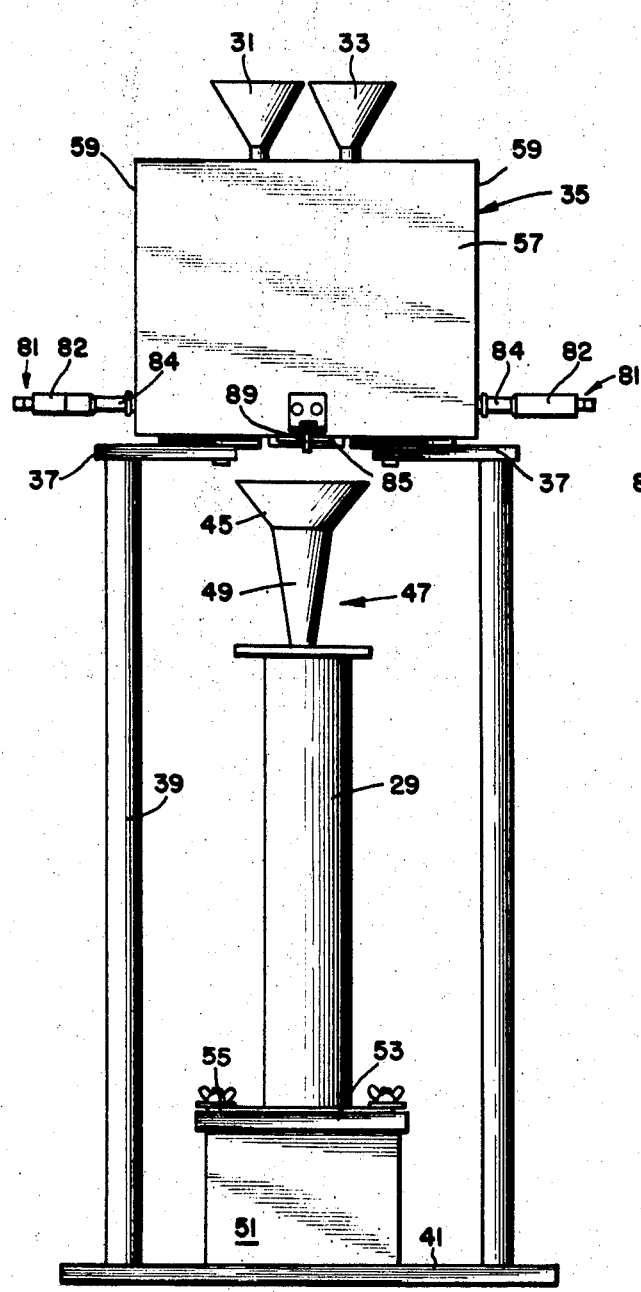
FIG. 1 is an elevational view of an apparatus embodying various features of the invention.

As shown in the drawings for purposes of illustration, the apparatus is provided for producing an article such as a nuclear fuel body 11 (FIG. 4) which is formed with a predetermined ratio of two different groups of particles, for example, fissile particles 13 and fertile particles 15 (FIG. 3) that are blended uniformly throughout the fuel element. Using the illustrated apparatus, the blend approaches theoretical uniformity even though the respective groups of particles may be unequal in size and density. The ratio of fissile to fertile particles may be varied from 50% fertile particles and 50% fissile particles, i.e., a one to one weight ratio of particles, to various other percentages by weight, such as, for example, a ratio of 30% fissile particles and 70% fertile particles.

The particles 13 and 15 desired to be blended are extremely small, usually having spheroidal particle sizes less than a millimeter. In a specific example hereinafter described, the fissile particles have diameters between about 300–500 microns and the fertile particles have diameters between about 500–700 microns. While it would appear that particles could be weighed and then be mixed with agitation, such has not proved successful, as the particles have coatings which may fracture and the particles tend to collect or stratify according to the respective sizes or densities and, hence, do not provide the desired uniformity of blend. Even if the particles were previously mixed in this manner and then poured directly into a mold they would slightly segregate during pouring into the mold. Not only is it desired to blend the particles, but also it is desired that particles be compacted to a predetermined packing fraction, usually about 65%, and be formed into a shape having relatively close dimensional tolerances.

Before proceeding with a detailed description of the preferred apparatus for making a fuel body, a brief resume of the preferred method of making the fuel bodies will be described. Generally, the method comprises first loading a charge of the fissle particles 13 into a first hopper 17, loading a charge of the fertile particles 15 into an adjacent, second hopper 19. At the bottom of each hopper is an orifice, 21 and 23, respectively, which is at least four times greater than the maximum dimension (or diameter) of the particles in the associated hopper and which is of a size to give a predetermined flow rate of particles from the associated hopper and thus serve to meter the particles flowing from the hoppers. The particles from the hoppers are directed downward against an inclined, deflecting surface 25 disposed so that the deflected particles blend together as they continue to drop from the deflecting surface down into a cavity 27 in an underlying mold 29. Preferably, the mold is vibrated as the particles are being dropped into the mold to compact the particles and to assure they completely fill the mold cavity 27.

Figure 2:
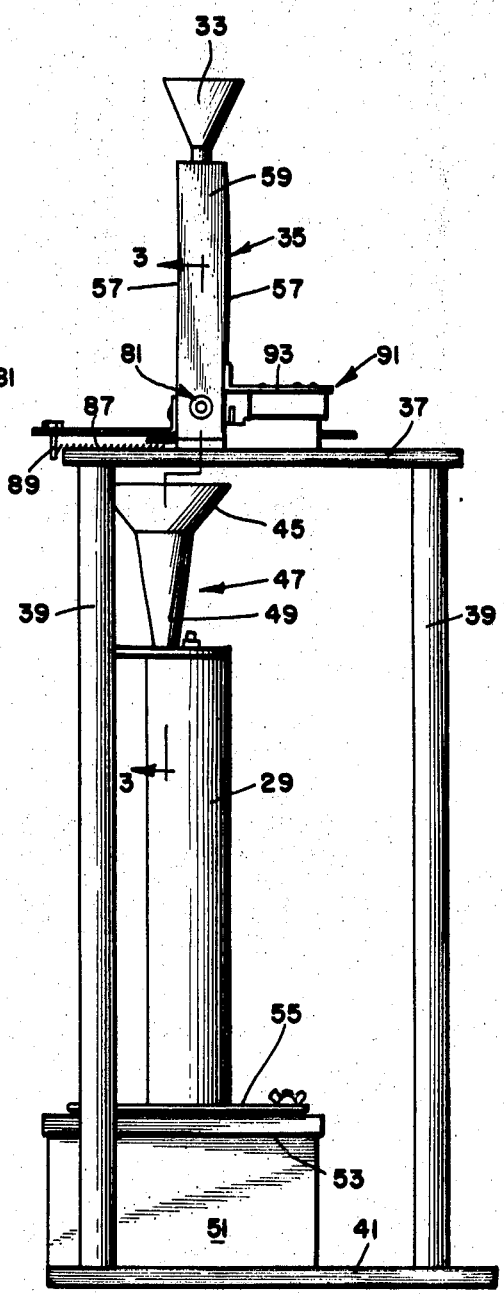
FIG. 2 is a side elevational view of the apparatus of FIG. 1.

Referring now, very generally, to the preferred apparatus for practicing the method of the invention, the fissile particles 13 are loaded in a first funnel 31 leading to the hopper 17 and, in a similar manner, the fertile particles 15 are loaded in a funnel 33 leading to the hopper 19. The respective hoppers are disposed within a housing 35 supported by a horizontal support 37 fixed to the upper ends of upstanding columns 39 which are fastened at their lower ends to a horizontal base 41. The particles 13 and 15 flow through orifices 21 and 23 (FIG. 3) at the bottom of their respective hoppers 17 and 19 when a gate 43 is operated to a position leaving the orifices uncovered whereby the particles fall through the orifices and drop onto the inclined deflecting surface 25 which is an upper frusto-conical section 45 of a blending device 47 which includes a lower, more narrow frusto-conical section 49 extending downwardly to the cylindrically shaped cavity 27 in the mold 29. As will be explained, the particles pass through the orifices 21 and 23 at flow rates determined by the size of the respective orifices. The particles leaving the orifices fall in separate streams, but they blend together as they deflect along and bounce downwardly toward the mold along paths which are only generally diagrammatically illustrated in FIG. 3. The blended particles are tightly compacted in the cavity 27 by means of a vibrating unit 51 (FIGS. 1 and 2) which is disposed on the base 41 and which has an upper vibrating element 53 that is clamped to a base plate 55 for the mold 29.

Proceeding now with a detailed description of the individual elements making up the apparatus, the housing 35 for the hoppers 17 and 19 is generally rectangular with relatively wide side walls 57 and narrow end walls 59 extending upwardly from a bottom wall 61 (FIG. 3) which is suitably fastened to the support plate 37. The interior surfaces of the side walls 57 define opposite sides of the respective hoppers 17 and 19 which are separated from one another by a vertically extending, common wall 63 which spans the opposed housing side walls 57. The lower ends of the housing walls 57 are provided with, at their lower ends, inclined inwardly and downwardly portions 58 to facilitate a continuous flow of particles toward the metering orifices at the bottom of the hoppers. For the purpose of defining further sides for the respective hoppers 17 and 19, a pair of vertically extending end walls 65 are spaced from the common wall 63 and extend laterally between the housing side walls 57.

By selecting the size of each of the respective orifices 21 and 23, a predetermined and given flow rate may be obtained for each kind of particles 13 and 15 being blended. It has been found that the particle flow rate depends on the orifice size and appears to be independent of the weight of the particles above the orifice. When the minimum dimension of the orifice is less than four times the particle size, it has been found that the particles may tend to bridge across the orifice and retard or stop the free flow of particles through the orifice.

It has also been found that better mixing is obtained with relatively slow flow rates and, hence, it is preferred that the size of the orifice 23 for the group of larger particles be made fairly close to a dimension of four times the diameter of the spheroids which will pass through it but sufficiently above this dimension to yield uniform flow rates and to prevent sporadic bridging. Flow rates for various sizes and densities of fertile and fissile particles and for a number of orifice sizes are observed empirically and collected so that the size of orifice needed for a given flow rate can be quickly and easily ascertained. With the flow rate for the larger particles established, and the desired blend ratio known, the desired flow rate for the smaller particles to obtain this blend ratio is easily calculated. The size of the orifice 21 for this flow rate is obtained by consulting the empirical data.

In accordance with an important aspect of the invention, the illustrated apparatus is capable of providing and blending different ratios of groups of particles for use in a fuel element, and it achieves the desired ratio of particles by adjusting the flow rate for one group of the particles relative to the flow rate for the other group of particles. To this end, each of the orifices 21 and 23 is defined by means which is adjustable to vary the size of its orifice and thereby the rate of flow of particles through the orifice. In the illustrated embodiment of the invention, the means for adjusting the orifices 21 and 23 includes a pair of sliding blocks 71 (FIG. 3) each of which is formed with a downwardly sloped side wall 73 which terminates at a lower interior edge 77 to define a movable edge or wall for its rectangularly shaped orifice. The other sides of the orifices are defined by the bottom edges of the common dividing wall 63 and the edges of inclined, side wall portions 58. Each of the blocks 71 is slideably mounted on the housing bottom wall 61 for sliding movement to bring its edge 77 toward or away from the common center wall 63.

At the upper and outer ends of each block 71, a rod 79 is attached to a bracket which is attached to a block 71. Each rod 79 extends horizontally and outwardly through apertures in the housing end walls 59 to a threaded end, not shown, of adjustment devices 81 (FIGS. 1 and 2) which are attached to the housing end walls 59. These adjusting devices are calibrated in the manner of a micrometer so that the position of the block 71 is indicated by markings on an outer turning barrel 82 (FIG. 1) of the adjusting device as the barrel is turned relative to an inner stationary sleeve 84 fastened to the end wall 59 of the housing. The barrel 82 is carried on the sleeve 84 and is threadedly connected to the rod 79 to move it to telescope longitudinally in the sleeve. In this manner, the edge 77 of the block 71 may be shifted relative to the center wall 63 so that the orifice can be easily adjusted.

For the purpose of simultaneously starting flow through the respective orifices 21 and 23 and simultaneously stopping flow from these orifices, it is preferred that means such as the mechanically operated gate 43 be mounted for movement between a closed position in which the orifices are covered and an open position in which the orifices are uncovered.

In this instance, the gate 43 is in the form of a plate or slide 83 of rectangular cross section mounted for sliding along a pair of spaced guide rails 85 to move between a closed position in which the slide covers the orifices 21 and 23 and an open position in which the slide moves laterally from beneath the respective orifices whereby particles may pass through the orifices. The slide 83 is biased to its closed position by a contractable spring 87 (FIG. 2) which is fastened at one end to a bracket 89 and fastened at its other end to the slide 83. To move the slide to its open position, a solenoid 91 (FIG. 2) is fastened by a bracket 93 to the opposite one of the housing side walls 57. Upon energization of the solenoid 91, its plunger moves the slide 83 to its open position, illustrated in FIG. 3, in which the orifices 21 and 23 are uncovered whereby particles fall through them to impinge against the deflecting surface 25. Upon de-energization of the solenoid 91, the spring 87 quickly returns the gate slide 83 to its closed position thereby stopping the flow of particles through both orifices 21 and 23 at substantially the same time.

Uniform blending of the particles is obtained by deflecting the particles along the frusto-conical sections 45 and 49 by which are supported by a generally circular plate 97 (FIG. 3) having an opening 99 aligned with and of a size generally corresponding to that of the cylindrical cavity 27. The frustoconical sections are suitably attached to the plate 97 as by welding. To assure the desired uniformity of blend is achieved, the angle $x$ (FIG. 3) of the upper frusto-conical section 45 should be between about 35° and about 40°. The angle the lower frusto-conical section 49 makes with the vertical should be less than that of the upper section, and preferably is between about 8° and 12°.

In the illustrated embodiment of the invention, the mold 29 is a right circular cylinder and contains six cavities 27 disposed equiangularly on a circle about the axis where there is located a threaded hole that accepts a screw 101 for connecting the plate 97 to the upper end of the mold 29 to the underside of the plate 97. A circular, upwardly projecting boss 103 is formed at the upper end of the mold and is received in a complementary shaped opening in the underside of the circular plate 97 to journal the plate and the attached blending device 47 for selective turning movement about the longitudinal axis of the mold to positions in which it is aligned to fill each of the mold cavities 27. In this manner, the blending device may be quickly turned into alignment with the next cavity 27 after the filling of the preceding cavity. This provides a fast method for filling the cavities for a plurality of fuel bodies. If desired, the bottom of each cavity 27 may be provided with a small marking disk (not shown) having raised identifying numbers which will provide an identification number at the end of the fuel body that results after a suitable fluid binder, for example, coal tar pitch, has been injected into the particle-filled cavity and hardened. The illustrated mold is made of a suitable material, such as stainless steel, wherein the fuel bodies can be baked to harden the binder. Alternatively, the mold may be a portion of a graphite fuel element, or the like, wherein fuel bodies are formed in situ. The injection and hardening steps are described in detail in copending patent application Ser. No. 703,-573 filed Feb. 7, 1968, entitled "Method of Making Nuclear Fuel Bodies," by Dwight E. Davis, Dennis W. Stevens and Geoffrey R. Tully, Jr.

By way of illustration only, a specific example of filling of cavity for a fuel body is hereinafter described. It is desired to provide a 50/50 ratio of fissile particles having diameters ranging between 500 microns to 354 microns to fertile particles having diameters ranging between 701 microns and 500 microns. The fissile particles are uranium-thorium dicarbide having a thorium to uranium ratio of about 4.25 to 1 and each having an outer pyrolytic carbon coating about 120 microns thick. The fertile particles are thorium dicarbide having outer pyrolytic carbon coatings about 130 microns thick. The width of the rectangular orifice 21 for the fissile particles is adjusted at approximately 0.0123 square inch and the width of the orifice 23 for the ferticle particles is adjusted to 0.0130 square inch. The length of both rectangular orifices is fixed at 0.125 inch.

At these settings, the smaller dimension of each of the orifices 21 and 23 is greater than four times the diameter of the largest particle in the respective hopper. The cross sectional areas of the rectangular orifices are approximately equivalent to those of circular orifices having diameters 0.125 inch and 0.129 inch respectively. Circular shaped orifices can be used to provide adequate control of flow, but it is preferred to use orifices which are square or rectangular in cross section as such cross sections more closely approach the arrangement of particles and lower flow rates can be achieved without bridging. Particles will flow through each orifice at a rate of approximately 1.1 grams per second. The resulting blends have been examined at various increments along the height of several particle-filled cavities. The percent deviation from a 50% fissile content in the various increments for those examined ranged between 1.8 to 2.1 percent maximum deviation, 0.6–0.8% average deviation and 0.8–1% standard deviation. The blend obtained is quite close to a theoretical maximum uniform distribution.

Good results have been obtained with other blends of similar fissile and fertile particles in which the flow rates were above 1.1 g./sec. Good results have also been obtained when the fissile particles have constituted as low as about 9.2% of the combined flow of fissile and fertile particles.

From the foregoing, it will be seen that the present invention provides a simple and efficient manner of uniformly blending two or more groups of particles in predetermined ratios. The compaction ratio of the result blend is satisfactory and a fuel body molded in the cavity has good dimensional characteristics and particle distribution throughout.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. Apparatus for making a nuclear fuel body containing a substantially uniform blend of at least two different groups of nuclear fuel particles of less than a millimeter in size, which apparatus comprises a first hopper holding a quantity of a first group of nuclear fuel particles, a second hopper holding a second group of nuclear fuel particles, means defining an orifice at the bottom of said first hopper, means defining an orifice at the bottom of said second hopper, means providing a deflecting surface which is inclined to the vertical and disposed vertically below both of said orifice-defining means to deflect and blend said first and second groups of nuclear fuel particles as they fall downward and impinge thereupon, means supporting said deflecting-surface-providing means at a sufficient height to accommodate a mold therebeneath, and a mold containing a cavity having the desired shape of the nuclear fuel body disposed vertically below said deflecting surface, said orifices having smallest dimensions at least four times the size of the nuclear fuel particles in the respective hopper thereabove and said orifices being sized relative to each other to provide a predetermined flow rate of the first group of nuclear fuel particles relative to the flow rate of the second group of nuclear fuel particles, whereby the groups of particles are mixed at a ratio corresponding to that of said flow rates and are blended to fill the fuel body cavity with a substantially uniform nuclear fuel composition.

2. Apparatus in accordance with claim 1 in which said deflecting surface is frusto-conical in shape and is centered vertically above said mold cavity.

3. Apparatus in accordance with claim 2 in which said means defining the respective first and second orifices are adjustable to vary the size of each orifice and thereby the rate of flow of particles therethrough.

4. Apparatus in accordance with claim 2 wherein a second frusto-conical surface which makes an angle with the vertical less than said deflecting surface is disposed at the lower end of said deflecting surface.

5. Apparatus in accordance with claim 1 wherein said deflecting surface makes an angle of between about 35° and about 40° with the vertical.

6. Apparatus in accordance with claim 1 including a gate for closing both of said orifices, said gate being movable to a position to open both of said orifices substantially simultaneously so that particles begin flowing from the respective hoppers at approximately the same time.

7. Apparatus in accordance with claim 1 in which the walls defining said chamber adjacent said orifice are sloped downwardly and in which said orifice is quadratically shaped to correspond substantially to the arrangement of particles in said chamber.

8. Apparatus in accordance with claim 1 including means to vibrate the mold while the particles are flowing and thereby compact the particles within said cavity.

9. Apparatus in accordance with claim 2 in which said mold includes a plurality of cavities each disposed on the circumference of a circle, and wherein each of said cavities may be pivoted into position to be filled with particles.

10. Apparatus for filling a cavity with a substantially uniform blend of at least two different groups of particles of less than a millimeter in size, which apparatus comprises a first hopper for receiving a quantity of a first group of particles, a second hopper disposed adjacent said first hopper for receiving a second group of particles, means defining an orifice at the bottom of said first hopper, means defining an orifice at the bottom of said second hopper, means providing a deflecting surface that is inclined to the vertical and disposed vertically below both of said orifice-defining means to deflect and blend both said first and second groups of particles as they fall downward and impinge thereon, and means for supporting said deflecting-surface-providing means above a cavity-containing mold for receiving the blended particles, said orifices having smallest dimensions at least four times the size of the particles to be received in the respective hopper thereabove and said orifices being sized relative to each other to give a predetermined flow rate of the first group of particles relative to the flow rate of the second group of particles, whereby the groups of particles are mixed at a ratio corresponding to that of said flow rates and fill said cavity with a substantially uniform blend.

References Cited
UNITED STATES PATENTS

| | | | |
|---|---|---|---|
| 629,120 | 7/1899 | Barlow | 141—105X |
| 1,276,341 | 8/1918 | Galleazzi | 141—74 |
| 1,311,955 | 8/1919 | Edison | 141—105X |
| 2,540,610 | 2/1951 | Davis et al. | 141—283X |

HOUSTON S. BELL, JR., Primary Examiner

U.S. Cl. X.R.

222—145